B. T. Loomis.
Expanding Tap and Reamer.
Nº 53,996. Patented Apr. 17, 1866.
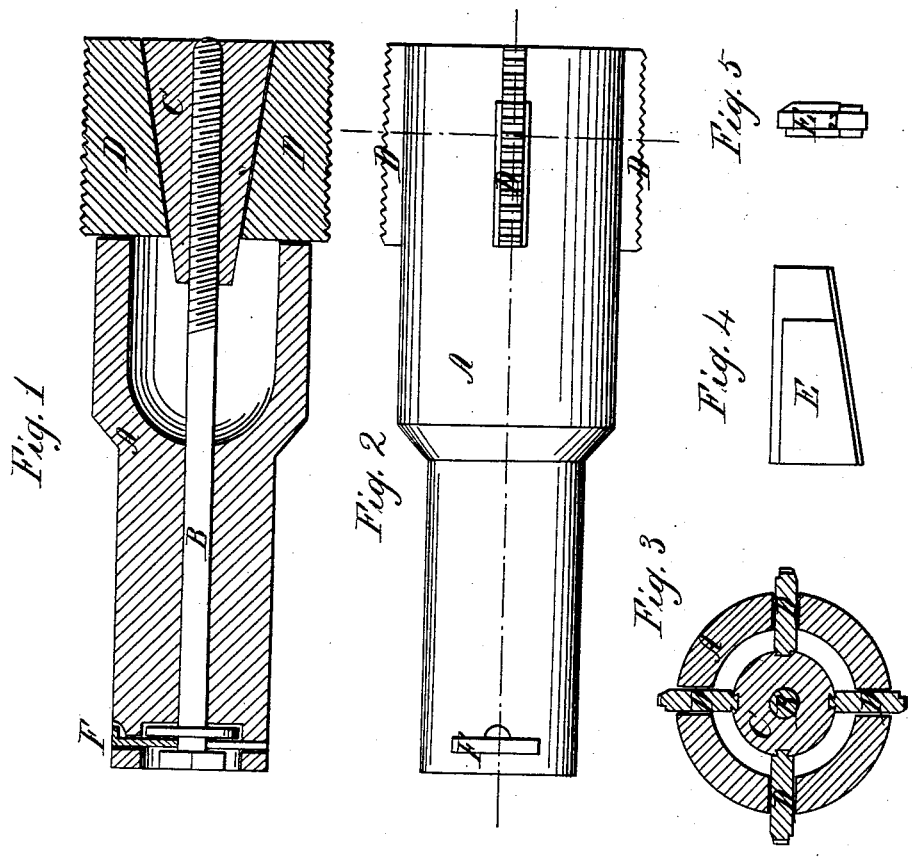

UNITED STATES PATENT OFFICE.

BENJN. T. LOOMIS, OF NEW YORK, N. Y.

IMPROVED EXPANDING-TAP AND REAMER.

Specification forming part of Letters Patent No. 53,996, dated April 17, 1866.

*To all whom it may concern:*

Be it known that I, B. T. LOOMIS, of the city, county, and State of New York, have invented a new and useful Improvement in Extension-Taps and Reamers; and I do hereby declare that the following is a full, clear, and exact description thereof, which will enable others skilled in the art to make and use the same, reference being had to the accompanying drawings, forming part of this specification, in which—

Figure 1 is a longitudinal section of my improved extension-tap and reamer through the line $y\ y$, Fig. 2. Fig. 2 is a side view of the same. Fig. 3 is a cross-section of the same through the line $x\ x$, Fig. 2. Fig. 4 is a side view of one of the knives or cutters when the machine is used as a reamer. Fig. 5 is an end view of the same.

Similar letters of reference indicate like parts.

My invention is designed to furnish a combined extension-tap and reamer; and it consists of a tool formed by combining a screw, plug, and cutters with each other and with the stock or holder in which they are placed, as hereinafter more fully described.

A is the stock or holder, which is made cylindrical in form and may be all of the same diameter, or the lower part may have a larger diameter than the upper part, the diameter of the upper part depending upon the size of the chuck which holds and operates the tool, and the diameter of the lower part upon the size of the holes required to be reamed or tapped. The lower part of the stock or holder is chambered, as represented in Figs. 1 and 3, and perforated longitudinally, as shown in Fig. 1. The lower end of the stock or holder is channeled or slotted with four channels or slots, as shown. These slots or channels are made smaller at their lower ends, as shown in Fig. 2.

B is a screw fitting into the hole through the upper part of the stock A, and having a screw-thread cut upon the lower end of said screw, which fits into the screw-thread cut upon the inner surface of the perforated plug C. The plug C is cone-shaped, and has four grooves or channels cut on its outer surface, corresponding with the four slots or channels in the lower part of the stock or holder A. These grooves are dovetailed, as shown in Fig. 3.

D and E are cutters, which are made in the form represented in Figs. 4 and 5. These cutters fit into the slots or channels formed in the lower part of the holder or stock A. Their lower inclined sides are dovetailed, so as to fit into the dovetailed grooves in the plug C, and the inclination of their inclined sides should correspond to the inclination of the outer side of the cone-shaped plug C, so that the outer or cutting edge of the cutters may be parallel with the axis of the tool, whatever be the relative positions of the plug C and the cutters D and E. When the tool is used as a tap the cutters D are used, whose outer or cutting edges are toothed or grooved, as shown in Figs. 1, 2, and 3, said teeth being so arranged that by the revolution of the tap a screw-thread will be cut in the hole tapped. When the tool is used as a reamer the cutters D are removed and the cutters E inserted in their place. The cutters D and E are similar in every respect except that the outer or cutting edges of the cutters D are toothed, so as to cut a screw-thread, while the outer or cutting edges of the cutters E are straight and smooth, as shown in Figs. 4 and 5.

F is a key inserted in a slit in the upper end of the holder A and fitting around a neck formed on the shank of the screw B near its head. If the screw B is turned while the key F is in place, the screw is prevented from moving vertically, and the effect is to draw the plug C in or push it out, according to the direction in which the said screw is turned. By this means the size of the tap or reamer may be adjusted to the size of the hole to be tapped or reamed. If the key F is removed and the screw turned back, the effect will be to withdraw the screw from the plug C, which may then be removed from the stock or holder and the cutters removed and changed.

In putting the parts together the cutters D or E are first put into their places. The plug C is then inserted in such a way that the dovetailed edges of the cutter shall enter the dovetailed grooves of the plug. The plug is then pushed down and the screw B and key F inserted. The screw is then turned until the tap or reamer is arranged to correspond with the size of the given hole.

I claim as new and desire to secure by Letters Patent—

The dovetailed cutters D or E, dovetail-grooved plug C, and screw B, in combination with the holder A, all constructed, arranged, and operating in the manner and for the purpose herein specified.

BENJN. T. LOOMIS.

Witnesses:
M. M. LIVINGSTON,
JAMES T. GRAHAM.